United States Patent [19]

Shinozaki et al.

[11] 4,309,713
[45] Jan. 5, 1982

[54] THERMAL RECORDING ELEMENTS

[75] Inventors: Fumiaki Shinozaki; Tomizo Namiki; Masao Kitajima; Tomoaki Ikeda; Yuzo Mizobuchi, all of Asaka, Japan

[73] Assignee: Fuji Photo Film Co., Ltd., Minami-ashigara, Japan

[21] Appl. No.: 52,277

[22] Filed: Jun. 26, 1979

[30] Foreign Application Priority Data

Jun. 26, 1978 [JP] Japan ............................ 53-77269

[51] Int. Cl.³ .................. G01D 15/34; G01D 15/10; B32B 15/08
[52] U.S. Cl. .................. 346/135.1; 346/76 R; 430/524; 430/536; 430/961; 428/463
[58] Field of Search .................. 346/135.1, 76 R; 430/524, 536, 961; 428/463, 522

[56] References Cited

U.S. PATENT DOCUMENTS

| 3,475,248 | 10/1969 | Brasure | 428/463 X |
| 3,519,511 | 7/1970 | Coorer, Jr. | 346/135.1 X |
| 3,600,217 | 8/1971 | Eichhorn et al. | 430/536 |
| 3,679,455 | 7/1972 | Kasugai et al. | 430/536 X |
| 3,682,639 | 8/1972 | Barbehenn et al. | 430/536 |
| 3,984,583 | 10/1976 | Hermans et al. | 346/135.1 X |
| 4,032,691 | 6/1977 | Kido et al. | 346/76 R X |
| 4,042,398 | 8/1977 | Holm et al. | 430/536 |
| 4,069,487 | 1/1978 | Kasai et al. | 346/135.1 X |
| 4,075,384 | 2/1978 | Suzuki | 346/135.1 X |
| 4,101,907 | 7/1978 | Bell et al. | 346/135.1 |
| 4,173,677 | 11/1979 | Nakano et al. | 428/463 X |

Primary Examiner—George H. Miller, Jr.
Attorney, Agent, or Firm—Sughrue, Mion, Zinn, Macpeak and Seas

[57] ABSTRACT

A thermal recording element comprising a support, a recording layer formed thereon and a chlorinated polyolefin layer formed on said recording layer.

19 Claims, 3 Drawing Figures

THERMAL RECORDING ELEMENTS

BACKGROUND OF THE INVENTION

1. Field of the Invention

This invention relates to a thermal recording element for recording information by exposure to high intensity radiation to thermally deform the recording layer and more particularly it relates to a high-sensitive thermal recording element capable of recording even by a low power high energy density beam.

2. Description of the Prior Art

As recording elements for recording information by exposure to high intensity radiation such as a laser beam, etc., there is a thermal recording element in addition to light-sensitive elements using silver salts, etc. In the thermal recording element the recording layer has a high optical density and the recording layer produces a local temperature increase by absorbing a high intensity irradiation whereby the irradiated portions are removed by thermal deformation such as fusion, evaporation, aggregation, etc. Information is recorded by the difference in optical density between the irradiated portions and non-irradiated portions.

Such a thermal recording element has the advantages that processings such as development, fixing, etc., are unnecessary, a dark room is unnecessary since the thermal recording element is not sensitive to ordinary room light, high contrast images are obtained, and addition recording (add on) of information is possible.

Recording on such a thermal recording element is generally performed by converting recording information to an electric time-succession signal and scanning the recording element by a laser beam the intensity of which is modulated according to the electric signal. In this case, there is also the advantage that a recording image is obtained in real time.

As the recording layer for such a thermal recording element, metals, dyes, plastics, etc., are suitably used and in general an inexpensive material can be used for the purpose. Such recording elements are described in, for example, M. L. Levene et al, *Electron, Ion and Laser Beam Technology*, (the records of the 11th Symposium held in 1969); *Electronics*, p. 50 (Mar. 18, 1968); D. Maydan, *The Bell System Technical Journal*, Vol. 50, 1761 (1971); C. O. Carlson, *Science*, Vol. 154, 1550 (1966), etc. Some of these recording elements contain metal recording layers. For example, such a recording element comprises a support having formed thereon a thin layer of a metal such as Bi, Sn, In, etc., and has excellent properties as thermal recording element since an image of high resolving power and high contrast can be recorded.

However, the recording element having a thin metal layer generally exhibits light reflectance of higher than 50% to laser light used for recording, which makes it impossible to effectively utilize the energy of the laser beam and hence the power of the laser beam used for recording must be higher, which requires a laser light source of high output for recording at high scanning speeds, and thus the recording apparatus used becomes larger and expensive.

Various recording elements having high recording sensitivity have been studied and as an example a recording element of three layer construction composed of Se, Bi and Ge is disclosed in U.S. Pat. No. 3,560,994. A thin layer of Ge is formed on the layer of Se and Bi to reduce the light reflectance of a thin layer composed of Se and Bi. However, the use of Se, etc., is undesirable since there is a possibility of toxicity problems and the images recorded are not satisfactory.

As another example of a recording element having a reflection preventing layer, a recording element having on the metal layer a reflection preventing layer having light absorption in the wavelength region of the laser beam used for recording is disclosed in Japanese Patent Application (OPI) No. 74632/76 (The term "OPI" as used herein refers to a "published unexamined Japanese patent application"). However, even if a reflection preventing layer is formed it is very difficult to completely eliminate the occurrence of light reflection and even if the occurrence of light reflection can be completely eliminated, a laser light source of high power is required to obtain thermal deformation of a thin metal layer by the irradiation of laser light and a recording element having higher sensitivity is needed.

Since the recording layer, e.g., a thin metal layer of the thermal recording element as mentioned above, is liable to scratch, a protective layer is formed on the metal layer of the recording element to improve the durability, mechanical strength, time stability, etc., of recording element. The protective layer must transmit the light beam of high energy density used for recording, have high mechanical strength, not react with the recording layer, exhibit good coating property, etc.

As the materials for the protective layer, inorganic materials or organic materials may be used. As the inorganic materials, transparent materials such as $Al_2O_3$, $SiO_2$, SiO, MgO, ZnO, $MgF_2$, $CuF_2$, etc., have been used. Inorganic materials for the protective layers are an excellent means and they are disclosed in, for example, Japanese Patent Application (OPI) Nos. 96716/74, 59626/76, 75523/76, 88024/76 and 134633/76. However, these recording elements having protective layers possessing effective strength as described in the above patent applications suffer from the drawback that the recording sensitivity is greatly reduced as compared with that of a recording element having no protective layer.

SUMMARY OF THE INVENTION

The object of this invention is to provide a high-sensitive thermal recording element for recording with a high energy density beam such as a laser.

It has been found that the recording sensitivity of a recording layer is greatly increased by forming a chlorinated polyolefin layer on a support and forming a recording layer on the chlorinated polyolefin layer. Furthermore, it has been found that the recording sensitivity is greatly increased in comparison to conventional materials by forming a chlorinated polyolefin layer on a recording layer as a protective layer instead of a conventional protective layer.

Thus, according to this invention, there is provided a thermal recording element comprising a support having provided thereon a recording layer and a chlorinated polyolefin layer adjacent to said recording layer. In addition, there is provided a thermal recording element in which the chlorinated polyolefin layer is located on the upper or lower side or both sides of the recording layer.

Figure 1:
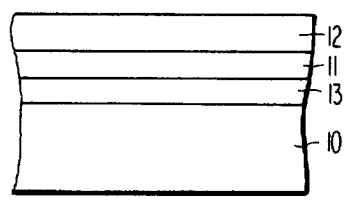
FIG. 1 is a schematic cross-sectional view showing an embodiment of the thermal recording element of this invention.

In the figures, the thermal recording element comprises a support 10, a metal layer 11, a layer of a material for increasing recording sensitivity 12, and a chlorinated polyethylene layer 13 or 14 in one embodiment and comprises a support 10, a metal layer 11, a layer of a material for increasing recording sensitivity 12, and chlorinated polyethylene layers 13 and 14 in another embodiment.

DETAILED DESCRIPTION OF THE INVENTION

As the support used in this invention, a variety of supports generally used for recording elements of this type may be used. For example, plastic films such as polyethylene terephthalate, polycarbonate, etc., glass sheets, papers, metal sheets or foils, etc., can be used. Polyethylene terephthalate is particularly preferred.

The recording layer used in this invention is a layer having high optical density and is preferably composed of a material having a high covering power in the form of a thin layer. Typical examples of such materials are metals. The recording layer used in this invention includes not only a layer composed of only the material having a high covering power in a thin layer (e.g., a metal layer) but also a recording layer unit composed of a metal layer and a layer of another material for increasing the recording sensitivity superposed on the metal layer, and a layer composed of a mixture of the metal and the other material for increasing the recording sensitivity. The recording layer is principally responsible for the change in optical permeability or light reflection by thermal deformation at the irradiated portions by the irradiation of a laser beam and various layer structures and various materials can be selectively employed for this purpose as will be readily recognized by those skilled in this art.

As the metals used for the recording layer in this invention, there are Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se, Te, etc., and they may be used alone or in combinations of two or more. The particularly preferred metals used in this invention as the recording layer are those that have low or no toxicity, the energy required for fusing or evaporating the metal layer is low, and the film or layer of the metal can be easily formed. Sn, Bi, and In are most preferred.

The thin layer of the metals can be formed in a single layer or double layers on a support or on a substrate or other layer formed on the support by various methods such as vacuum deposition, sputtering, ion plating, electroplating, electroless plating, etc., as a single layer or a layer of a combination or alloy of two or more metals. Furthermore, the metal may be applied as a layer wherein the metal and the material for increasing the sensitivity coexist in a physically mixed state by means of co-deposition together with the material.

The thickness of the metal layer should be capable of giving the necessary image density and is generally about 300 to 1,500 Å but varies with the kind of the metal used. Also, in the case of forming the metal layer on a support by vacuum deposition, sputtering, ion plating, etc., the layer structure of the metal layer differs with the nature of the support, temperature, the degree of vacuum, the speed of vacuum deposition, etc., and hence the thickness of the metal layer necessary for obtaining a desired optical density depends on all these factors.

It is preferred that the metal be used together with a material for increasing the recording sensitivity as a mixture or as a laminate layer of them. The material used increases the recording sensitivity by preventing reflection or other actions. As the materials used for this purpose, there are those materials which accelerate the thermal deformation of the metal by preventing light reflection. There are oxides such as PbO, $WO_3$, $TiO_2$, SiO, $SiO_2$, $ZrO_2$, etc.; chalcogen compounds such as the compounds of Ge, In, Sn, Cu, Ag, Fe, Bi, Al, Si, Zn, V, etc.; halides such as $PbX_2$, AgX, $SnX_2$, $SbX_5$, $SbX_3$, etc., (wherein X represents fluorine, chlorine, bromine, iodine, etc.); and As, Sb, P, Ge, Si, Te, etc. It is preferred that these materials have as low toxicity as possible, they have low hygroscopicity or deliquescence, or low deterioration with the passage of time by the dark reaction with the metal, and they can easily form the layer or film. For the purposes, the use of GeS, SnS, $PbI_2$, etc., is particularly preferred. The thickness of these materials depends upon the kind of metal used in the metal layer, the thickness of the metal layer, etc., but is usually about 50 to 1,000 Å.

As the chlorinated polyolefin used in this invention, chlorinated polyethylene or chlorinated polypropylene having higher than about 30%, preferably higher than about 50%, more preferably about 50 to 70%, chlorination degree is particularly preferred from the standpoints of stability and solubility. Such a chlorinated polyolefin can be coated on a support in a solvent solution in a known method. As the solvent for the polymer, toluene, xylene, ethyl acetate, butyl acetate, cellosolve acetate, methyl ethyl ketone, 1,2-dichloroethane, methyl isobutyl ketone, cyclohexanone, tetrahydrofuran, ethyl ether, dioxane, etc., can be used. These solvents may be used alone or in mixture, or further as a mixed solvent with a non-solvent such as cyclohexane.

To increase the stability of the chlorinated polyolefin, additives such as ultraviolet absorbents, etc., may be added thereto. Ultraviolet absorbents described in Japanese Patent Application (OPI) No. 16124/72, e.g., 2,2'-dihydroxy-4-methoxybenzophenone, 4-dodecyloxy-2-hydroxybenzophenone, 2,4-dihydroxybenzophenone, hydroxyphenylbenzotriazole, 2-(2'-hydroxy-5'-methoxyphenyl)benzotriazole, resorcinol monobenzoate, 2-hydroxy-4-methoxybenzophenone, 2,2'-dihydroxy-4,4'-dimethoxybenzophenone, 2,2',4,4'-tetrahydroxybenzophenone, 2-hydroxy-4-methoxybenzophenone-5-sulfonic acid and sodium salt thereof, ethyl 2-cyano-3,3-diphenylacrylate, 2-ethylhexyl 2-cyano-3,3-diphenylacrylate, etc., can be used. The ultraviolet absorbent is preferably used in an amount of about 0.01 to 5 wt%.

Furthermore, the chlorinated polyolefin used in the present invention preferably has a viscosity of 20 to 3,000 cps in 40% toluene at 25° C. and a softening point of about 100° to 140° C. (the softening point is the temperature at which a 2 mm thick press molded sample of the polyolefin deforms under its own weight).

When the chlorinated polyolefin layer is formed under the recording layer, a sufficient effect for increasing the recording sensitivity is obtained if its thickness is greater than about 0.05 μm and the effect depends scarcely upon the thickness of the layer. However, if the thickness of the layer is too great, the recording element is liable to crack at bending and hence in this case it is necessary to add a plasticizer, etc., to the layer. In general, the thickness of the chlorinated polyolefin layer is preferably from about 0.05 μm to about 10 μm when it is used between the support and the recording layer.

When the chlorinated polyolefin layer is employed as a protective layer, the thickness thereof may be in the range of 0.2 μm to 10 μm.

The invention will now be explained by the following examples, however, these examples are not to be construed as limiting.

EXAMPLE 1

A comparison sample was prepared by depositing a layer of a metal as shown in Table 1 at a thickness of 350 Å on a polyethylene terephthalate film of 100 μm thick under the condition of $5 \times 10^{-5}$ Torr and further depositing thereon the layer of the chalcogen compound or halide as shown in the table at a thickness of 200 Å to form a recording layer. In this case, the transmission optical density of each sample was in the range of 1 to 2.

Then, a sample of the thermal recording element of this invention was prepared as follows: A coating composition having the following composition was coated on a polyethylene terephthalate film 100 μm thick at a dry thickness of 0.3 μm to form a chlorinated polyethylene layer.

Methyl Ethyl Ketone: 70 ml
Methyl Cellosolve Acetate: 30 ml
Chlorinated Polyethylene (Superkurone 907 HA, made by Sanyo Kokusaku Pulp K. K.): 2 g Thereafter, on the chlorinated polyethylene layer were formed the metal layer and the reflection preventing layer under the same conditions as with the comparison sample.

FIG. 1 is a schematic cross-sectional view showing the sample thus prepared. As shown in the figure, the thermal recording element is composed of a support 10, a metal layer 11, a compound layer 12, and a chlorinated polyethylene layer 13.

A recording test was performed on each of the samples by scanning the recording layer with an argon ion laser beam (wavelength of 5,145 Å) of the maximum output of 2 watts focused into the beam of 25 μm in diameter at a scanning speed of 19 meters/sec and the minimum output of the laser capable of forming a record 10 μm in diameter on each sample was determined. From the value of the laser output, the recording sensitivity of the sample was compared. The results are shown in Table 1.

As is clear from Table 1, in the sample of this invention having the chlorinated polyethylene layer, the output of the laser required for recording was lower than that in the comparison sample having no such chlorinated polyethylene layer. That is, the sample of this invention had high recording sensitivity as compared with the comparison sample.

TABLE 1

| Sample No. | Recording Layer | | Laser Output (m watt) | |
|---|---|---|---|---|
| | Metal Layer | Compound Layer | Comparison Sample | Sample of the Invention |
| 1 | Sn | SnS | 200 | 150 |
| 2 | " | GeS | 175 | 125 |
| 3 | " | PbI₂ | 100 | 75 |
| 4 | " | AgCl | " | " |
| 5 | " | CuI | " | " |
| 6 | " | SnI₂ | " | " |
| 7 | Bi | PbI₂ | " | " |
| 8 | In | GeS | 175 | 125 |

EXAMPLE 2

The same procedure as in Example 1 was followed using chlorinated polypropylene in place of chlorinated polyethylene and the same increase in recording sensitivity was obtained.

EXAMPLE 3

A comparison sample was prepared by depositing Sn on a polyethylene terephthalate film 100 μm thick at a thickness of 300 Å under the condition of $5 \times 10^{-5}$ Torr and then depositing thereon GeS at a thickness of 250 Å to form a recording layer. When the recording sensitivity was measured on the comparison sample in the manner as explained in Example 1, the minimum output of laser required for recording was 175 m watts.

Then, comparison samples having following the substrates were prepared and the recording sensitivity was measured on each sample. That is, as the substrate, isobutyl polymethacrylate, a phenol resin, butyral, polyurethane (Esthane (trademark) produced by Good Rich Co.), vinylidene chloride, or gelatin was coated on the support at a dry thickness of 0.3 μm. Then, the recording layer having the same construction as the aforesaid comparison sample was formed on the substrate. The recording sensitivity of each of the samples was 150 m watts.

Then, a sample of this invention was prepared by coating as a substrate chlorinated polyethylene at a dry thickness of 0.3 μm and then forming thereon the recording layer as described above. The recording sensitivity of the sample of this invention was 100 m watts. That is, the existence of the chlorinated polyethylene layer as the substrate remarkably increased the recording sensitivity.

EXAMPLE 4

The following experiment was conducted to show that the chlorinated polyethylene layer has an effect of increasing the recording sensitivity as a protective layer.

Figure 2:
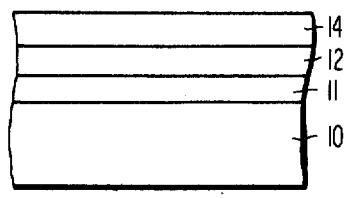
FIG. 2 is a schematic cross-sectional view showing another embodiment of this invention.

A recording layer was formed by depositing Sn on a polyethylene terephthalate film 100 μm thick at a thickness of 300 Å under the condition of $5 \times 10^{-5}$ Torr and then depositing thereon GeS at a thickness of 250 Å. Then, on the recording layer was formed a chlorinated polyethylene layer at a dry thickness of 0.3 μm. This structure is shown in FIG. 2, in which numeral 14 is a chlorinated polyethylene layer. The recording sensitivity was 225 m watts.

On the other hand, the recording sensitivities of comparison samples prepared by coating isobutyl polymethacrylate and butyral ethyl cellulose respectively at a dry thickness of 0.3 μm in place of chlorinated polyethylene were 275 m watts and also the recording sensitivity of a comparison sample prepared by forming a protective layer of polyvinyl alcohol at a dry thickness of 0.3 μm was 325 m watts. Thus, it was confirmed that chlorinated polyolefin was effective for increasing the recording sensitivity as a protective layer.

Figure 3:
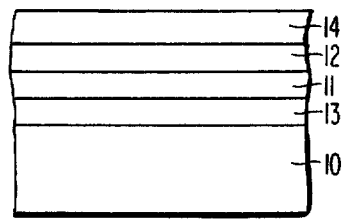
FIG. 3 is a schematic cross-sectional view showing a third embodiment of this invention.

In addition, when chlorinated polyethylene layers 13 and 14 were formed over and under the recording layer as shown in FIG. 3, a high-sensitive thermal recording element was obtained.

While the invention has been described in detail and with reference to specific embodiments thereof, it will be apparent to one skilled in the art that various changes and modifications can be made therein without departing from the spirit and scope thereof.

What is claimed is:

1. A thermal recording element having increased recording sensitivity to thermal radiation comprising a support having provided thereon a recording layer having high optical density which undergoes thermal deformation under the action of high intensity radiation to result in a difference in optical density between irradiated areas and non-irradiated areas and a chlorinated polyolefin layer adjacent said recording layer, said chlorinated polyolefin layer increasing the thermal recording sensitivity of said recording layer.

2. The thermal recording element of claim 1, wherein said chlorinated polyolefin layer is disposed between the recording layer and the support.

3. The thermal recording element of claim 1, wherein said chlorinated polyolefin layer is disposed on the recording layer.

4. The thermal recording element of claim 1, wherein said chlorinated polyolefin layer is disposed on both sides of the recording layer.

5. The thermal recording element of claim 1, wherein said support is polyethylene terephthalate.

6. The thermal recording element of claim 1, wherein said recording layer is a metal layer.

7. The thermal recording element of claim 1, wherein said recording layer is a layer of Sn, Bi or In.

8. The thermal recording element of claim 1, wherein said recording layer is a layer of GeS, SnS or $PbI_2$.

9. The thermal recording element of claim 1, wherein said recording layer is composed of a mixture of Sn, Bi or In and GeS, SnS or $PbI_2$ or composed of a layer of Sn, Bi or In and a layer of GeS, SnS or $PbI_2$.

10. The thermal recording element of claim 1, wherein the thickness of said laminated layer of said material is about 50 to 1,000 Å.

11. The thermal recording element of claim 1, wherein said chlorinated polyolefin is chlorinated polyethylene or chlorinated polypropylene.

12. The thermal recording element of claim 1, wherein the thickness of said chlorinated polyolefin layer is about 0.05 μm to 10 μm when the layer is disposed between the recording layer and the support.

13. The thermal recording element of claim 1, wherein the thickness of said chlorinated polyolefin layer is about 0.2 μm to 10 μm when the layer is disposed on the recording layer as a protective layer.

14. The thermal recording element of claim 1, wherein said recording layer is a metal layer and has a thickness of about 300 to 1500 Å.

15. The thermal recording element of claim 1, wherein said recording layer is a metal and is used together with a material to increase the recording sensitivity, said material being used as a mixture with said material or as a laminated layer of said material in combination with a layer of said metal, said material being selected from the group consisting of PbO, $WO_3$, $TiO_2$, SiO, $SiO_2$, $ZrO_2$, chalcogen compounds of Ge, In, Sn, Cu, Ag, Fe, Bi, Al, Si, Zn and V, a halide selected from the group consisting of $PbX_2$, AgX, $SnX_2$, $SbX_5$, and $SbX_3$ wherein X represents fluorine chlorine, bromine or iodine.

16. The thermal recording element of claim 1, wherein said chlorinated polyolefin is chlorinated polyethylene or chlorinated polypropylene having a chlorination degree higher than about 30%.

17. The thermal recording element of claim 16, wherein said chlorination degree is higher than about 50%.

18. The thermal recording element of claim 16, wherein said chlorination degree is about 50 to 70%.

19. The thermal recording element of claim 16, wherein said chlorinated polyethylene or chlorinated polypropylene has a viscosity of 20 to 3000 cps in 40% toluene at 25° C. and a softening point of about 100° to 140° C.

* * * * *